United States Patent
Sayenko et al.

(10) Patent No.: US 12,096,379 B2
(45) Date of Patent: Sep. 17, 2024

(54) SYSTEMS AND METHODS FOR CONFORMING TO INDOOR/OUTDOOR REGULATIONS IN UNLICENSED BANDS

(71) Applicant: Apple Inc., Cupertino, CA (US)

(72) Inventors: Alexander Sayenko, Munich (DE); Anatoliy Sergey Ioffe, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 17/500,463

(22) Filed: Oct. 13, 2021

(65) Prior Publication Data

US 2022/0361115 A1 Nov. 10, 2022

Related U.S. Application Data

(60) Provisional application No. 63/185,488, filed on May 7, 2021.

(51) Int. Cl.
*H04W 52/28* (2009.01)
*H04W 4/029* (2018.01)

(52) U.S. Cl.
CPC ......... *H04W 52/283* (2013.01); *H04W 4/029* (2018.02)

(58) Field of Classification Search
CPC ................................. H04W 52/283
See application file for complete search history.

(56) References Cited

U.S. PATENT DOCUMENTS

| | | | |
|---|---|---|---|
| 9,037,123 B2 | 5/2015 | Malmbak et al. | |
| 10,880,840 B1* | 12/2020 | Mansour | H04W 52/367 |
| 2005/0128970 A1* | 6/2005 | Tsien | H04W 52/243 |
| | | | 370/315 |
| 2006/0165032 A1* | 7/2006 | Hamalainen | H04W 52/40 |
| | | | 370/328 |
| 2011/0201377 A1* | 8/2011 | Kazmi | H04W 52/244 |
| | | | 455/522 |
| 2011/0205106 A1* | 8/2011 | Bria | G01S 19/11 |
| | | | 342/352 |
| 2012/0270536 A1* | 10/2012 | Ratasuk | H04W 52/283 |
| | | | 455/423 |

(Continued)

FOREIGN PATENT DOCUMENTS

JP 2016134698 A 7/2016

OTHER PUBLICATIONS

Extended European Search Report for EP Patent Application No. 22167745.3 dated Sep. 29, 2022; 11 pgs.

(Continued)

*Primary Examiner* — Wen W Huang
(74) *Attorney, Agent, or Firm* — FLETCHER YODER PC

(57) ABSTRACT

Techniques for controlling the maximum transmission power utilized by transmitters of user equipment are provided. More specifically, a base station may control a transmission power of a transmitter of user equipment that is communicatively coupled to the base station to cause the transmission power of the transmitter to comply with regulations of a geographic location that the user equipment is in. In addition to the base station, the user equipment may control the transmission power of the transmitter. In either case, the transmission power may be based on whether the user equipment is located indoors or outdoors, whether the base station is deployed indoors or outdoors, or both.

20 Claims, 8 Drawing Sheets

(56) References Cited

U.S. PATENT DOCUMENTS

| | | | |
|---|---|---|---|
| 2013/0157638 A1* | 6/2013 | Malmbak | H04W 4/025 |
| | | | 455/418 |
| 2017/0171835 A1* | 6/2017 | Ökvist | H04W 8/08 |
| 2021/0037479 A1* | 2/2021 | Akkarakaran | H04W 52/383 |
| 2022/0035501 A1* | 2/2022 | Kobori | G06F 3/0441 |
| 2022/0248344 A1* | 8/2022 | Kalavakuru | H04W 52/346 |
| 2022/0264477 A1* | 8/2022 | Akkarakaran | H04W 52/283 |

OTHER PUBLICATIONS

Apple Inc., "On simultaneous low power and very low power operation", 3GPP RAN WG4 Meeting #98bis-e, Apr. 12-20, 2021, 5 pages.

Qualcomm Inc., "Revised WID on NR-based Access to Unlicensed Spectrum" 3GPP TSG RAN Meeting #86, Dec. 9-12, 2019, 11 pages, Sitges, Spain.

3GPP, "3rd Generation Partnership Project; Technical Specification Group Radio Access Network; Feasibility Study on 6 GHz for LTE and NR in Licensed and Unlicensed Operations (Release 17)", Technical Report, Dec. 2020, 23 pages, Valbonne, France.

Nokia, Nokia Shanghai Bell, "WID on introduction of lower 6GHz NR unlicensed operation for Europe", 3GPP TSG RAN Meeting #90e, Dec. 7-11, 2020, 4 pages.

* cited by examiner

US 12,096,379 B2

SYSTEMS AND METHODS FOR CONFORMING TO INDOOR/OUTDOOR REGULATIONS IN UNLICENSED BANDS

CROSS-REFERENCE TO RELATED APPLICATIONS

This application claims priority to U.S. Provisional Patent Application No. 63/185,488, entitled "SYSTEMS AND METHODS FOR CONFORMING TO INDOOR/OUTDOOR REGULATIONS IN UNLICENSED BANDS," filed on May 7, 2021, which is incorporated herein by reference in its entirety for all purposes.

BACKGROUND

The present disclosure relates generally to wireless communication between user equipment (e.g., cell phones, tablets) and communication networks (e.g., cellular networks). More specifically, the radio frequency spectrum may include licensed spectrums (e.g., frequency ranges) that are assigned exclusively to network operators for independent usage, and unlicensed spectrums assigned to users for non-exclusive usage subject to some regulations. The Third Generation Partnership Project (3GPP) allows radio frequency communication over the unlicensed spectrums of the 5 gigahertz (GHz) band (e.g., the n46 band from 5150-5925 megahertz (MHz) and the 6 GHz band (e.g., the n96 band from 5925-7125 MHz), and published studies on how the unlicensed 60 GHz band may be used for wireless cellular communication. However, operating in an unlicensed spectrum may require that user equipment conform to transmission power constraints that are different depending if a communication network is deployed indoors versus outdoors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a base station includes a transceiver that is disposed inside of a structure and sends and receives data. The base station also includes processing circuitry that is communicatively coupled to the transceiver. The processing circuitry sends, using the transceiver, a first instruction to user equipment communicatively coupled to the base station to transmit data using a first transmission power. The processing circuitry also receives an indication as to whether the user equipment is located inside of the structure or outside of the structure. Furthermore, the processing circuitry sends, using the transceiver, a second instruction to the user equipment to transmit data using a second transmission power less than the first transmission power based on the indication indicating that the user equipment is located outside of the structure.

In another embodiment, a computer-implemented method includes receiving, at a receiver of user equipment, an instruction from a base station to configure a transmitter of the user equipment to transmit data with a first transmission power. The computer-implemented method also includes receiving, at the receiver, an indication from the base station that the base station is located indoors. Additionally, the computer-implemented method includes configuring, using the at least one processor, the transmitter of the user equipment to transmit data with a second transmission power that is less than the first transmission power.

In yet another embodiment, a non-transitory computer-readable medium includes instructions that, when executed by processing circuitry, cause the processing circuitry to determine whether a base station is deployed indoors or outdoors and cause a transmitter of user equipment to be configured to transmit data using a transmission power based on determining that the base station is deployed indoors or outdoors.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
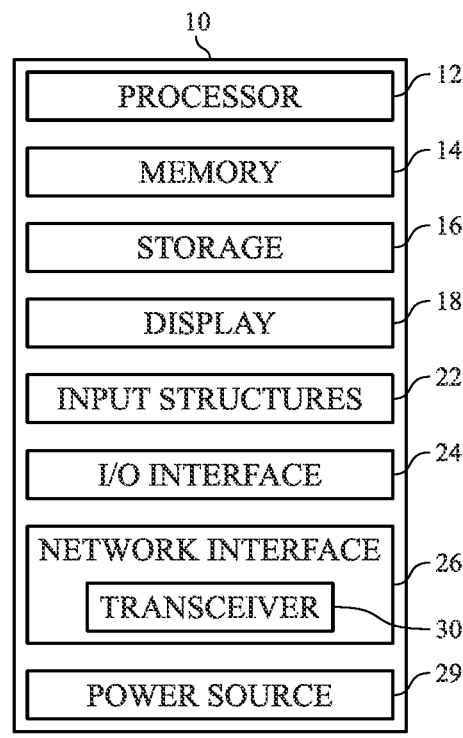
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to controlling transmission power (e.g., maximum transmission power) utilized by circuitry to transmit data, such as transmitter or transceiver that may be included in an electronic device. More specifically, the transmission power may be controlled by a base station or the electronic device that includes the transmitter to conform to transmission power constraints which may vary between different geographic locations. For example, the power constraints may be defined by regulations established by a country or a group of countries (e.g., the European Union or member countries of the European Conference of Postal and Telecommunications Administrations (CEPT)), and the regulations may identify several transmission power values (e.g., maximum transmission power values) that are permissible depending if a communication network, the electronic device, or both are deployed indoors or outdoors.

Embodiments herein provide various apparatuses and techniques to control transmission power utilized by transmitters or electronic devices. Indeed, as described below, in some embodiments, a base station may control the transmission power (e.g., the maximum transmission power) of the transmitter of an electronic device that is communicatively coupled to the base station. To do so, the base station may cause the transmitter to use a relatively lower transmission power (e.g., suitable for outdoor transmission) when the base station is deployed outdoors, when the electronic device is not configured to determine if the electronic device is located indoors or outdoors, when the electronic device is located outdoors, or when a combination thereof occurs. Conversely, when the base station is deployed indoors and the electronic device is also located indoors, the base station may enable the transmitter or transceiver of the electronic device to be configured to utilize a relatively higher transmission power (e.g., suitable for indoor transmission). As another example, as discussed below, an electronic device may control the transmission power of the transmitter of the electronic device. More specifically, when the electronic device determines that the electronic device or a base station to which the electronic device is communicatively coupled is deployed outdoors, a relatively lower transmission power may be utilized. However, when the electronic device determines that the electronic device and the base station are both indoors, the transmitter of the electronic device may utilize a relatively higher transmission power.

Keeping the foregoing in mind, FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FTC)), and/or for a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a satellite network, and so on.

In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas (not shown in FIG. 1). The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
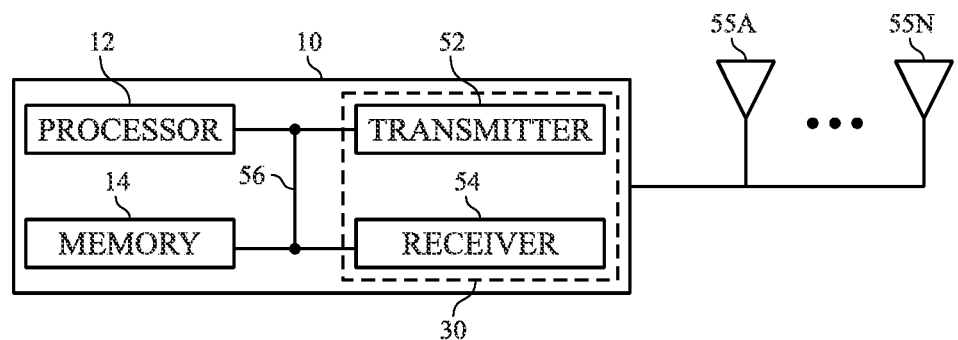
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, the transmitter 52, the receiver 54, and/or the antennas 55 (illustrated as 55A-55N) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
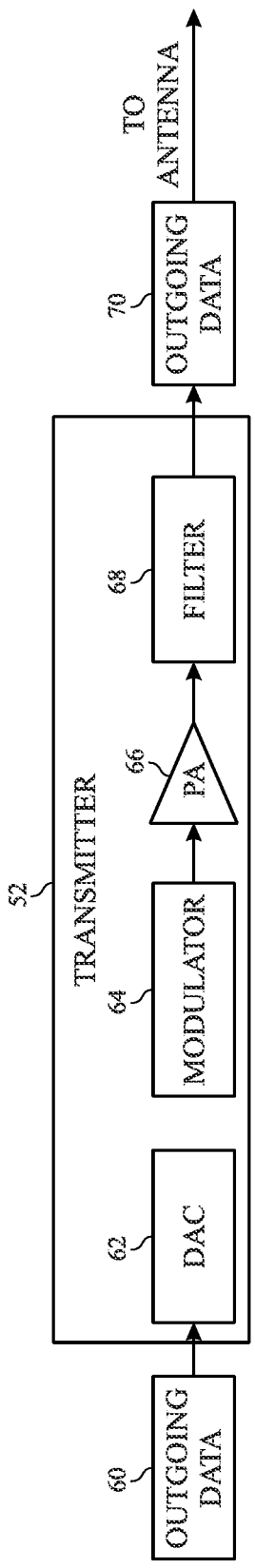
FIG. 3 is a block diagram of a transmitter of the electronic device of FIG. 1, according to an embodiment of the present disclosure.

Continuing with the drawings, FIG. 3 is a schematic diagram of the transmitter 52 (e.g., transmit circuitry), according to an embodiment of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives signal the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
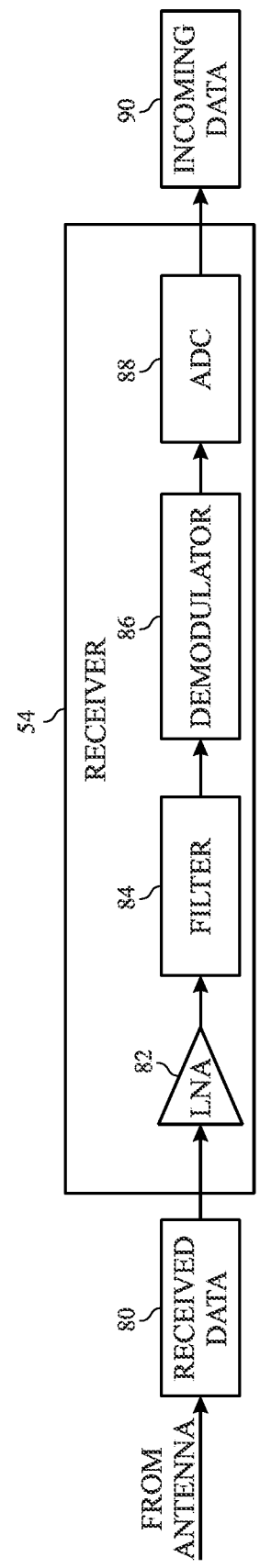
FIG. 4 is a block diagram of a receiver of the electronic device of FIG. 1, according to an embodiment of the present disclosure.

FIG. 4 is a schematic diagram of the receiver 54 (e.g., receive circuitry), according to an embodiment of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 which are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 5:
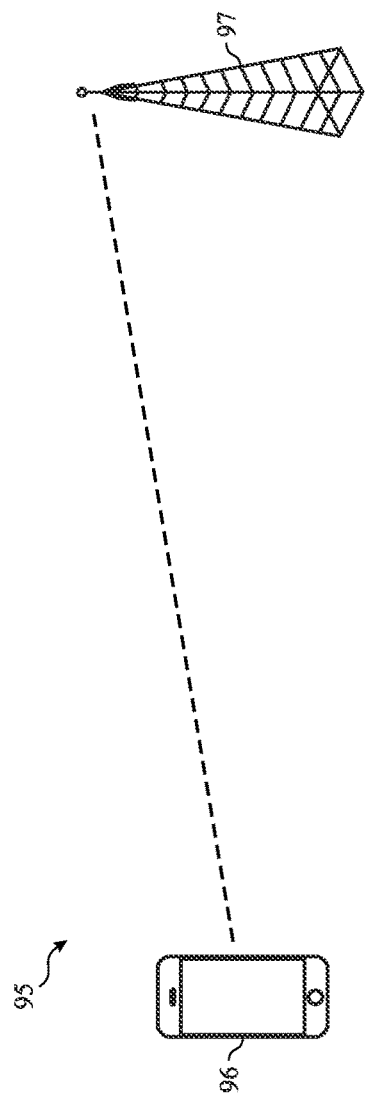
FIG. 5 is a diagram of a wireless communication network supported by a base station and communicatively coupled to user equipment, which may include the electronic device of FIG. 1, according to an embodiment of the present disclosure.

FIG. 5 is a diagram illustrating a wireless communication network 95 support by a base station 97 and communicatively coupled to user equipment 96 according to an embodiment of the present disclosure. In particular, the base station 97 may provide 5G/New Radio (NR) coverage (e.g., a Next Generation NodeB (gNodeB or gNB) base station) via the wireless communication network 95. The user equipment 96 and the base station 97 may include at least some of the components of the electronic device 10 shown in FIG. 1 and FIG. 2, including one or more processors 12, the memory 14, the storage 16, the transmitter 52, the receiver 54, and the associated circuitry shown in FIG. 3 and FIG. 4. The base station 97 may assign communication channels to the user equipment 96 that may be within unlicensed bands such as the n96 frequency band (e.g., 5.925 GHz to 7.125 GHz (inclusive)) discussed in further detail below.

As noted above, this disclosure is directed to controlling transmission power (e.g., maximum transmission power) utilized by circuitry to transmit data, such as the transmitter 52 or the transceiver 30 that may be included in the electronic device 10. More specifically, the transmission power may be controlled by the base station 97 or the user equipment 96 that includes the transmitter 52 or the transceiver 30 to conform to transmission power constraints which may vary between different geographic locations. For example, the power constraints may be defined by regulations established by a country or a group of countries (e.g., the European Union and CEPT member countries), and the regulations may identify several transmission power values (e.g., maximum transmission power values) that are permissible depending if the base station 97, the user equipment 96, or both are deployed indoors or outdoors.

Embodiments herein provide various apparatuses and techniques to control transmission power utilized by the transmitter 52 of the user equipment 96. Indeed, as described below, in some embodiments, the base station 97 may control the transmission power (e.g., the maximum transmission power) of the transmitter 52 of the user equipment 96 that is communicatively coupled to the base station 97. To do so, the base station 97 may cause the transmitter 52 to use a relatively lower transmission power (e.g., suitable for outdoor transmission) when the base station 97 is deployed outdoors, when the user equipment 96 is not configured to determine if the user equipment 96 is located indoors or outdoors, when the user equipment 96 is located outdoors, or when a combination thereof occurs. Conversely, when the base station 97 is deployed indoors and the user equipment 96 is also located indoors, the base station 97 may enable the transmitter 52 of the user equipment 96 to be configured to utilize a relatively higher transmission power (e.g., suitable for indoor transmission). As another example, as discussed below, the user equipment 96 may control the transmission power of the transmitter 52 of the user equipment 96. More specifically, when the user equipment 96 determines that the user equipment 96 or the base station 97 to which the user equipment 96 is communicatively coupled is deployed outdoors, a relatively lower transmission power may be utilized. However, when the user equipment 96 determines that the user equipment 96 and the base station 97 are both indoors, the transmitter 52 of the user equipment 96 may utilize a relatively higher transmission power.

Figure 6:
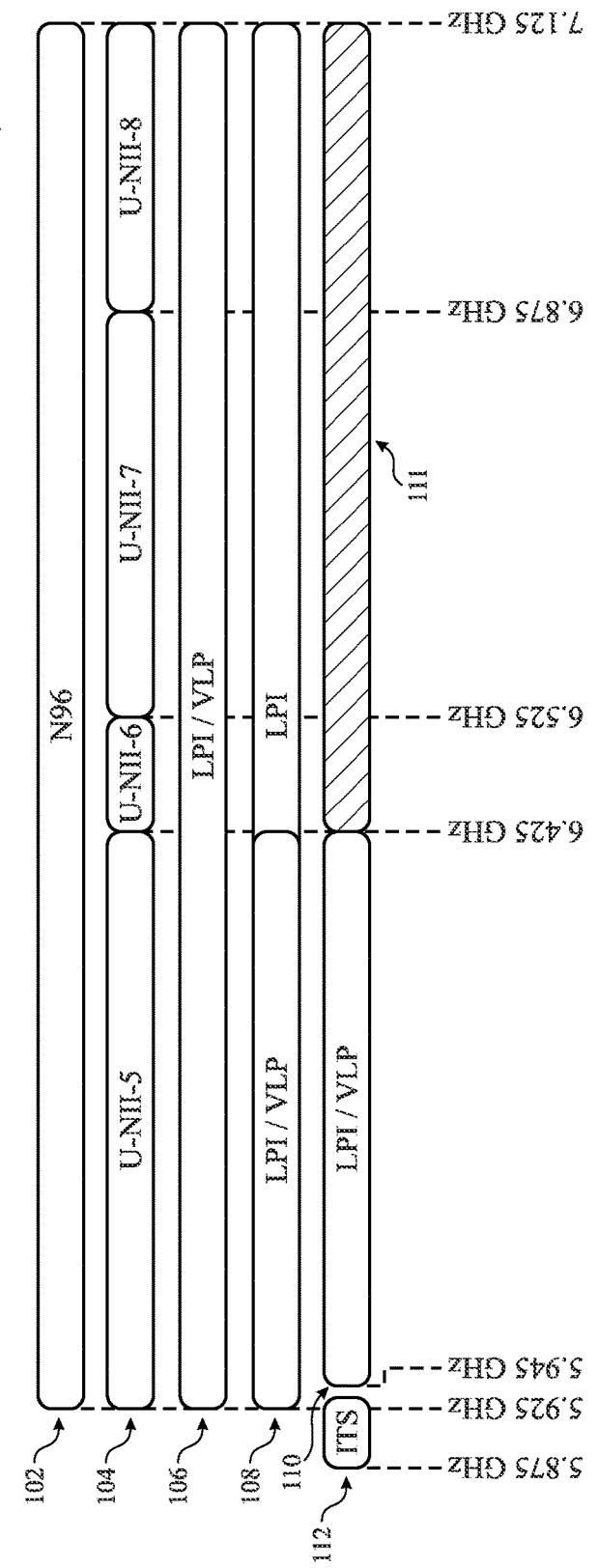
FIG. 6 is a frequency diagram of several frequency bands including an n96 frequency band and frequency sub-bands associated with several different locations, according to an embodiment of the present disclosure.

Bearing the foregoing in mind, FIG. 6 is a frequency diagram 100 of an n96 frequency band 102 and sub-bands (e.g., 102, 104, 106, 108, 110, 112) associated with several different locations, according to an embodiment of the present disclosure. In particular, the n96 frequency band may be described and defined in the Third Generation Partnership Project 3GPP technical standard (TS) 38.101 as a frequency band in Frequency Range 1 (FR1) that ranges from 5.925 GHz to 7.125 GHz (inclusive). The frequency band 102 may be an unlicensed or licensed-exempt band, meaning the operator of the user equipment 96 (e.g., the electronic device 10) that emits signals having frequencies within the licensed-exempt band may utilize the user equipment 96, for example, without registering the user equipment 96 directly with an entity (e.g., a government agency) associated with a particular geographical area in which the user equipment 96 is used.

With that said, different geographic locations may have different regulations regarding the sub-bands of the frequency band 102 that user equipment 96 may utilize, such as transmission power levels (e.g., effective isotropic radiated power (EIRP) and EIRP density values) that the user equipment 96 may utilize to transmit data. More specifically, different geopolitical areas (e.g., countries, unions, continents) may have regulations governing maximum power levels depending on whether the user equipment 96 is located indoors or outdoors. As used herein, the terms "outdoor(s)" and "indoor(s)" may have a different meaning depending on regulations associated with a particular jurisdiction. For example, in some jurisdictions a location that is considered to be "indoors" may be considered "outdoors" in another jurisdiction. For example, a location that is covered by a temporary structure that is open to the outside (e.g., a covering that does not include walls, such as an awning that extends from a building) may be considered to be indoors in one jurisdiction and outdoors in another jurisdiction. With that said, "outdoor(s)" generally includes uncovered settings that are located outside of buildings, such as, houses, other residential buildings, commercial buildings, industrial buildings, or any other type of building. Conversely, "indoors" generally includes settings that are located inside of permanent structures. For settings that fall outside of these descriptions, characterization can be made in accordance with rules and regulations of the jurisdiction(s) (e.g., countries, unions, continents) including such settings. Table 1 below provides information for power levels that are permitted within the United States, the European Union/CEPT, South Korea, and Brazil. It should be noted that values included in Table 1 may be subject to change in the future.

TABLE 1

| Country | Permissible operation | Frequency range | Maximum mean EIRP for in-band emissions | Maximum mean EIRP density for in-band emissions | Maximum mean EIRP density for out-of-band emissions |
|---|---|---|---|---|---|
| US | Standard power: Outdoor with automatic frequency control (AFC). | 5925-6425 MHz<br>6525-6875 MHz | 36 dBm (AP)<br>30 dBm (CL)<br>(can be reduced to 17 dBm using AFC) | 23 dBm/MHz (AP)<br>17 dBm/MHz (CL) | −27 dBm/MHz<br>(outside operational range) |
| | LPI: The access point devices cannot be weather resistant and shall have integrated antennas (prohibiting connection to other antennas). Operations in moving vehicles (cars, trains, aircraft) and drones are prohibited, with one exception in the U-NII-5 band for large passenger aircraft operating over 10,000 feet. | 5925-7125 MHz | 30 dBm (AP)<br>24 dBm (CL) | 5 dBm/MHz (AP)<br>−1 dBm/MHz (CL) | |
| EU/CEPT | LPI: Restricted for indoor use only (including trains where metal coated windows are fitted and aircraft). Outdoor use (including in road vehicles) is not permitted. | 5945-6425 MHz | 23 dBm | 10 dBm/MHz | −22 dBm/MHz<br>(below 5935 MHz) |
| | VLP: Indoors and outdoors. Use on drones is prohibited. The VLP device is a portable device. | | 14 dBm | 1 dBm/MHz | −45 dBm/MHz<br>(below 5935 MHz) |
| South Korea | LPI: A device shall use power supply from a wired connection, and a client battery powered device must communicate through the device connected to a wired power supply. This frequency range cannot be used for indoor automotive or airplane deployments. Usage inside moving vehicles is prohibited | 5925-7125 MHz | 24 dBm | 2 dBm/MHz | −27 dBm/MHz<br>(outside operational range) |
| | VLP: Very low power indoor and outdoor usage. | 5925-6425 MHz | 14 dBm | 1 dBm/MHz | −34 dBm/MHz<br>(outside operational range) |

TABLE 1-continued

| Country | Permissible operation | Frequency range | Maximum mean EIRP for in-band emissions | Maximum mean EIRP density for in-band emissions | Maximum mean EIRP density for out-of-band emissions |
| --- | --- | --- | --- | --- | --- |
| Brazil | LPI: The AP equipment must be used only in an indoor environment. It must be powered directly by the electric power network, and battery power is not allowed. Their physical structures cannot be protected against bad weather. The operation is prohibited on oil extraction platforms, cars, trains, boats and aircraft, with the exception of operation in the 5.925-6.425 GHz band inside large aircraft flying above 3,048 m. Client equipment must operate under the control of an indoor AP. | 5925-7125 MHz | 30 dBm (AP) 24 dBm (CL) | 5 dBm/MHz (AP) −1 dBm/MHz (CL) | −27 dBm/MHz (outside operational range) |
|  | VLP: Very low power indoor and outdoor usage |  | 17 dBm | −5 dBm/MHz |  |

As generally indicated by Table 1, different countries and regions may permit different power levels (e.g., maximum EIRP values and maximum EIRP density values) to be utilized by user equipment 96 that transmit data (e.g., by emitting electromagnetic radiation having a frequency within a licensed-exempt frequency band such as the frequency band 102). As alluded to by the names of the power levels (e.g., lower power indoor (LPI) and very low power indoor/outdoor (VLP)) utilized in the European Union/CEPT and South Korea, as well as their associated maximum EIRP and maximum EIRP density values, higher transmission power is generally permitted for user equipment 96 that is located indoors relative to user equipment 96 that is located outdoors. For example, in the European Union and CEPT member countries, LPI—which has a maximum EIRP of 23 decibel milliwatts (dBm) and a maximum EIRP density of 10 dBm/megahertz (MHz)—may be utilized by user equipment 96 indoors, while VLP—which has a maximum EIRP of 14 dBm and a maximum EIRP density of 1 dBm/MHz—may be utilized by user equipment 96 located indoors as well as user equipment 96 located outdoors.

Keeping the discussion of Table 1 in mind, the portions of the frequency band 102 that user equipment 96 may utilize in various locations (e.g., countries, unions, continents) may also be regulated, and, in some cases, subdivided. For example, the frequency band 104 is indicative of the range of frequencies permitted to be utilized in the United States. More specifically, the frequency band 104 includes Unlicensed National Information Infrastructure (U-NII) 5, 6, 7, and 8 (i.e., U-NII-5, U-NII-6, U-NII-7, and U-NII-8). Accordingly, the entirety of the frequency band 102 may be utilized in the Unites States.

As an example of another jurisdiction, the frequency band 106 corresponds to Brazil. As illustrated, the frequency band 106 occupies the entirety of the frequency band 102. That is, the frequency band 106 also includes the entire n96 frequency band. Furthermore, as indicated by the frequency band 106, LPI and VLP as defined by Brazilian regulations may be utilized within the entire n96 frequency band.

Frequency band 108 corresponds to South Korea. Similar to the United States (as indicated by frequency band 104) and Brazil (as indicated by frequency band 106), the frequency band 108 includes the entirety of the frequency band 102. Therefore, the entire n96 frequency band may be utilized by user equipment 96 in South Korea. Additionally, the frequency band 108 includes a LPI portion and an LPI/VLP portion, which respectively indicate 1) frequencies in the n96 frequency band that may be utilized outdoors and 2) frequencies in the n96 frequency band that may be utilized outdoors and indoors. The transmission power values associated with the LPI and VLP power levels are the values associated with South Korea indicated in Table 1.

Frequency bands 110, 111, and 112 correspond to frequency bands applicable within the European Union and CEPT member countries. In particular, frequency bands 110 and 112 are frequency bands that include frequencies permitted to be utilized, while frequency band 111 includes frequencies (e.g., 6.425 GHz-7.125 GHz) that are impermissible. The frequency band 110 includes LPI and VLP power levels associated with the European Union and CEPT member countries as indicated in Table 1. The frequency band 112 corresponds to the Intelligent Transport Systems (ITS) band as described in the International Telecommunication Union (ITU) Report ITU-R M.2445-0, entitled "Intelligent transport systems (ITS) usage." As illustrated in FIG. 6, a portion of the frequency band 112 falls within the n96 frequency band (i.e., frequency band 102).

As described below, the maximum transmission power that the user equipment 96 may utilize may be controlled based on several factors, such as whether the user equipment 96 is located indoors or outdoors and/or whether a base station 97 to which the user equipment 96 is communicatively coupled is deployed indoors or outdoors. The discussion below is generic in terms of geographic or geopolitical location. In other words, the examples and techniques described below may be utilized in any suitable area (e.g., country, union, continent), and the manner in which techniques are performed may be done in a location-specific manner. For example, for user equipment 96 located in the United States, maximum transmission power values (e.g., maximum EIRP and maximum EIRP density values) such as those provided in Table 1 may be utilized, while in another location (e.g., the European Union/CEPT member country, Brazil, South Korea, or any other location outside of the United States) the techniques may be performed in a similar manner using maximum transmission power values associated with the other location.

Figure 7:
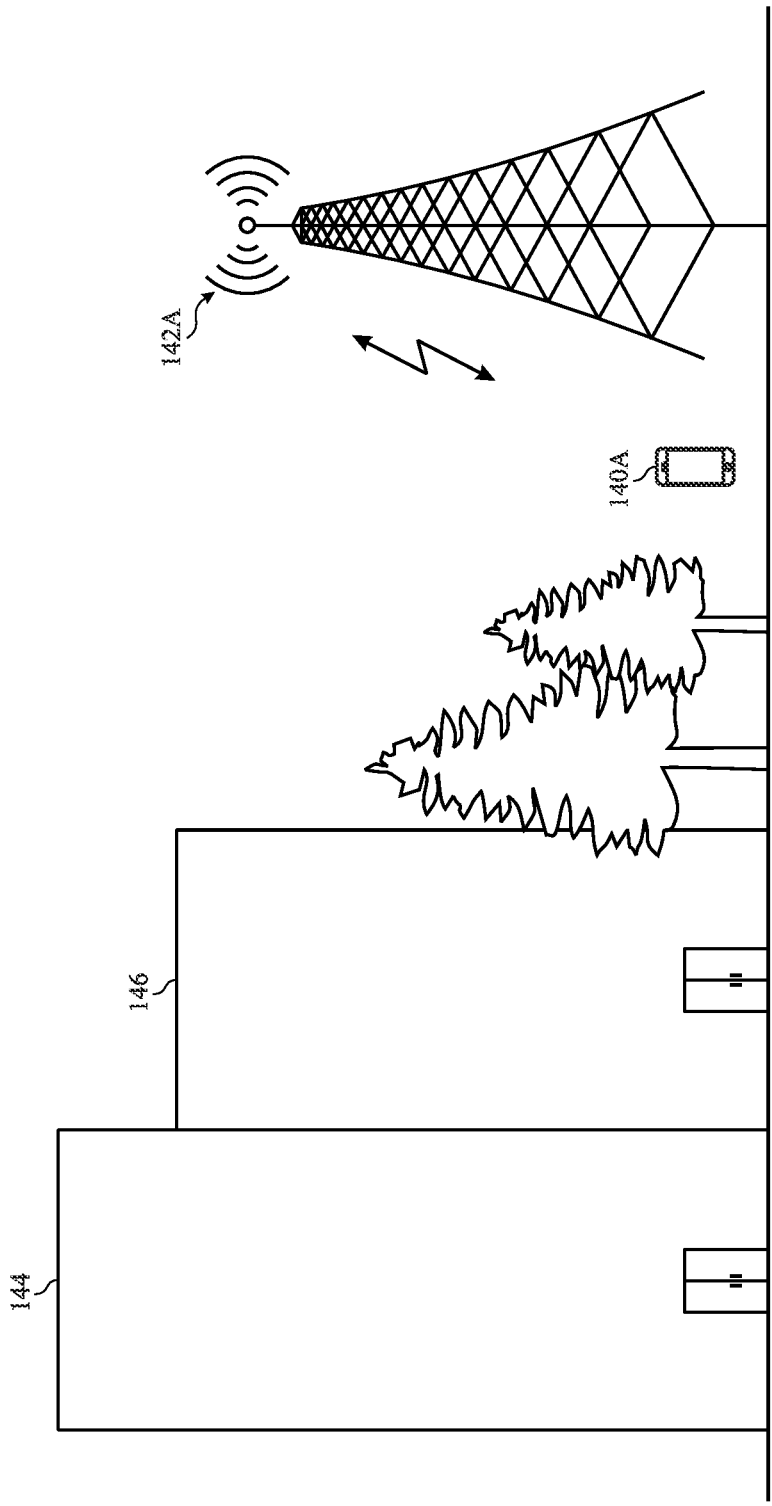
FIG. 7 is a diagram of user equipment such as the electronic device of FIG. 1 that is located outdoors and communicatively coupled to a base station that is deployed outdoors, according to an embodiment of the present disclosure.

To help provide more context for when the maximum transmission power of user equipment 96 may be controlled, FIG. 7 and FIG. 8 will be discussed. FIG. 7 illustrates user equipment 140A, which may include the electronic device 10, that is communicatively coupled to a wireless communication network via a base station 142A. FIG. 7 also includes buildings 144, 146, which may be structures such as houses, apartment buildings, offices, other forms or residential or commercial buildings, or industrial buildings. In other words, each of the buildings 144, 146 may be a permanent structure.

More particularly, FIG. 7 illustrates a scenario in which the user equipment 140A is located outdoors and communicatively coupled to a base station (i.e., base station 142A) that is also located outdoors. As used herein, the terms "outdoor(s)" and "indoor(s)" may have a different meaning depending on regulations associated with a particular jurisdiction. For example, in some jurisdictions a location that is considered to be "indoors" may be considered "outdoors" in another jurisdiction. For example, a location that is covered by a temporary structure that is open to the outside (e.g., a covering that does not include walls, such as an awning that extends from a building) may be considered to be indoors in one jurisdiction and outdoors in another jurisdiction. With that said, "outdoor(s)" generally includes uncovered settings that are located outside of buildings, such as the buildings 144, 146, houses, other residential buildings, commercial buildings, industrial buildings, or any other type of building. Conversely, "indoors" generally includes settings that are located inside of permanent structures, such as the buildings 144, 146. For settings that fall outside of these descriptions, characterization can be made in accordance with rules and regulations of the jurisdiction(s) (e.g., countries, unions, continents) including such settings. Furthermore, the terms "indoor(s)" and "outdoor(s)" may refer to characteristics (including physical characteristics) of a base station (e.g., 142A, 142B, collectively 142). For example, in certain jurisdictions, how certain portions or circuitry included in a base station are encased, protected (e.g., protected by a lock), or powered (e.g., battery powered in comparison to being powered by an electrical outlet or other grid-based power source) may govern whether the particular base station is "indoors" or "outdoors," regardless of where the particular base station is physically located. For instance, in some jurisdictions, if the base station 142 is not battery powered or is not weatherproof, the base station 142 may be considered indoors. All the foregoing being said, the base station 142 may be configured as being indoors or outdoors based on an installer or manufacturer setting a parameter (e.g., configuration data) of the base station 142. As such, it may be the case that the value (e.g., indoors or outdoors) that the parameter is set to is what governs whether the base station 142 is indoors or outdoors. Thus, as used herein, a base station (e.g., 142A) being "deployed outdoors" may refer to the base station 142A having a parameter being set to indicate that it is outdoors, and a base station (e.g., 142B) being "deployed indoors" may refer to the base station 142B having a parameter being set to indicate that it is indoors.

As discussed above, when the user equipment 140A is located outdoors, the user equipment 140A is generally permitted to use a lower maximum transmission power compared to if the user equipment 140A were located indoors when operating on an unlicensed spectrum. One particular reason for this is because when the user equipment 140A is indoors, signals transmitted by the user equipment 140A may pass through walls or other interfering materials that the signals would otherwise not pass though were the user equipment 140A located indoors. That is, in order for signals transmitted by the user equipment 140A to reach a base station that is located indoors (e.g., base station 142B in FIG. 8), a higher transmission power may be utilized by a transmitter (or transceiver) of the user equipment 140A to better enable the signals to be transmitted to reach the base station 142B through the walls of the building when operating on an unlicensed spectrum.

Figure 8:
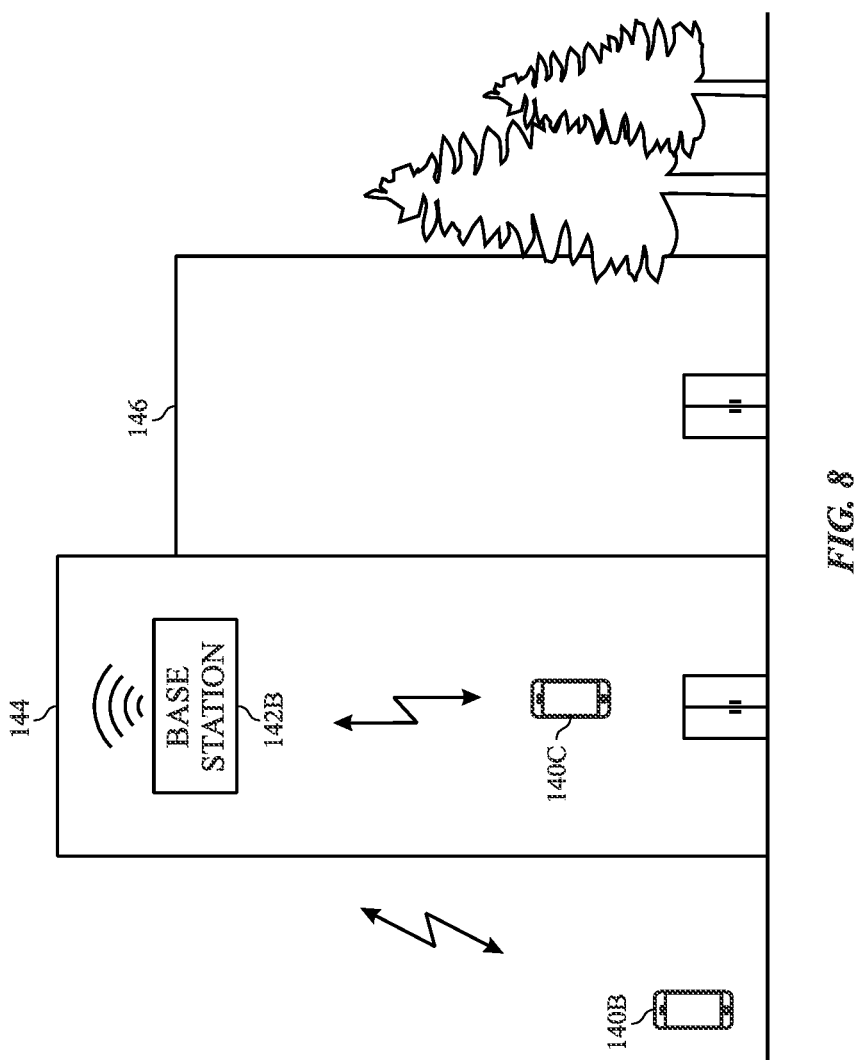
FIG. 8 is diagram that includes user equipment indoors and outdoors that are communicatively coupled to a base station that is deployed indoors, according to an embodiment of the present disclosure.

For example, in FIG. 8, user equipment 140B and user equipment 140C are communicatively coupled to a base station 142B that is deployed indoors (e.g., inside of the building 144). The user equipment 140B and user equipment 140C may include the electronic device 10. The user equipment 140C, like the base station 142B, is located indoors (e.g., inside of the building 144). As noted above, when user equipment 140 (e.g., user equipment 140A, 140B, 140C) is indoors, regulations generally allow for the user equipment 140 to utilize relatively higher transmission power compared to devices located outdoors when operating on an unlicensed spectrum. Accordingly, to communicative with the base station 142B, the user equipment 140C may use a relatively higher transmission power and still be operating in accordance with rules or regulations particular to the geographic location of the user equipment 140C when operating on an unlicensed spectrum.

However, in some cases, the user equipment 140B, which is located outdoors, may also communicate with the base station 142B using the same (indoor) maximum transmission power as the user equipment 140C (e.g., instead of using a lower outdoor) maximum transmission power). A more specific example of this may be user equipment 140 located outdoors utilizing LPI when the user equipment 140 should be using VLP to transmit data (e.g., despite being coupled to an indoor base station). Accordingly, there are instances when user equipment (e.g., 140B) may operate with a transmission power that is higher than a maximum transmission power permitted to be used (e.g., outdoors) in the area in which the user equipment is geographically situated. As described below with respect to FIGS. 9-11, several techniques (e.g., processes) may be employed to cause user equipment (e.g., 140B) to comply with regulations when operating on an unlicensed band, even when the user equipment 140B is located outdoors and the base station (e.g., 142B) to which the user equipment 140B is coupled is deployed indoors.

Figure 9:
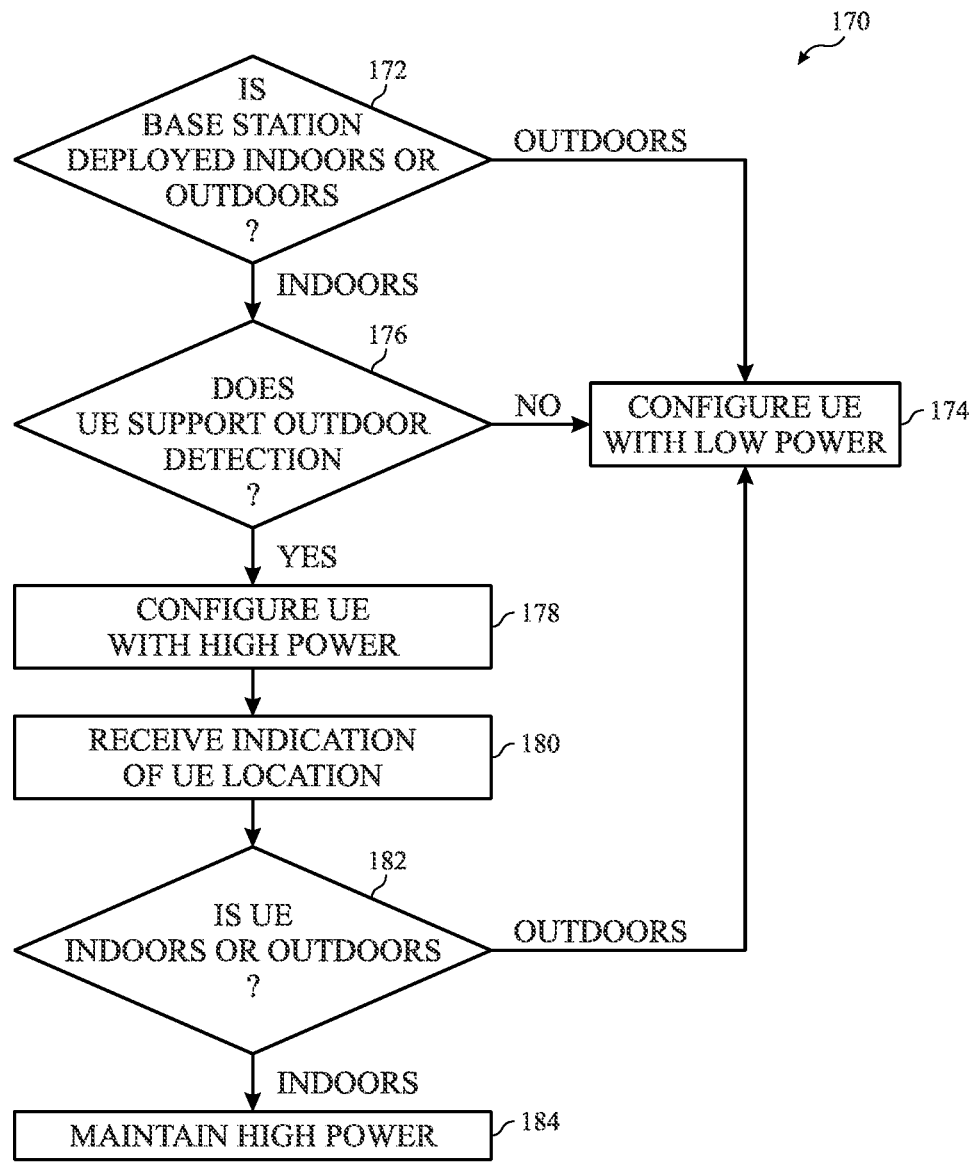
FIG. 9 is flow diagram of a process that the base stations of FIG. 7 and FIG. 8 may perform to control transmission power utilized by the user equipment of FIG. 7 and FIG. 8 that initially defaults to assuming that the user equipment is indoors when the base station is indoors, according to an embodiment of the present disclosure.

FIG. 9 is a flow diagram of a process 170 that may be employed by a base station (e.g., 142A, 142B, collectively 142) to control transmission power utilized by the user equipment (e.g., 140A, 140B, 140C, collectively 140) that initially defaults to assuming that the user equipment is indoors when the base station is indoors, according to an embodiment of the present disclosure. Any suitable device (e.g., a controller) that may control components of the base stations 142, such as the processor 12, may perform the process 170. In some embodiments, the process 170 may be implemented by executing instructions stored in a tangible, non-transitory, computer-readable medium, such as the memory 14 or storage 16, using the processor 12. For example, the process 170 may be performed at least in part by one or more software components, such as an operating system of one or more of the base stations 142, one or more software applications of the base stations 142, and the like. Furthermore, while the process 170 is described using steps in a specific sequence, it should be understood that the present disclosure contemplates that the described steps may be performed in different sequences than the sequence illustrated, and certain described steps may be skipped or not performed altogether.

At decision block 172, the processor 12 determines whether the base station 142 (e.g., that includes the processor 12) is deployed indoors or outdoors. To make such a determination, the processor 12 may check one or more values stored on in the memory 14 or storage 16 that are indicative of whether the base station 142 is an outdoor base station or an indoor base station. For example, at setup (e.g., when a technician or engineer initializes or resets the base station 142), one or more bit values may be stored (e.g., in memory 14 or storage 16) indicating whether the base station 142 has been set up as an indoor base space station or outdoor base station. As such, the processor 12 may determine whether the base station 142 is deployed indoors or outdoors based on the value(s). Furthermore, it should be noted that the operations described above with respect to decision block 172 may be initiated in response to user equipment 140 attempting to establish, or successfully establishing, a wireless connection to the base station 142 that includes the processor 12.

If, at decision block 172, the processor determines that the base station 142 is deployed outdoors, at process block 174, the processor 12 causes the user equipment 140 to be configured with low transmission power. In particular, the processor 12 may cause the base station 142 to send an instruction (e.g., a radio resource control (RRC) connection reconfiguration message, a medium access control (MAC) control element (MAC-CE), and so on) to the user equipment 140 that reconfigures the transmitter 52 of the user equipment 140 to transmit with low transmission power. More specifically, the instruction may be indicative of one or more maximum transmission power values (e.g., maximum EIRP, maximum EIRP density, or both) that the transmitter 52 of the user equipment 140 may utilize to transmit data.

As noted above, different geographic locations may have different regulations that include different maximum transmission power values. When performing process block 174, the maximum transmission power values that the user equipment 140 may be configured to use may include one or more of the values discussed above with respect to Table 1 (e.g., maximum EIRP, maximum EIRP density, or both), may correspond to a sub-band illustrated in FIG. 6, or both. For example, in a case in which the base station 142 is located within the United States that is performing process block 174, the instruction transmitted by the base station 142 may indicate one or more sub-bands of the frequency band 104 (e.g., one or more of U-NII-5, U-NII-6, U-NII-7, U-NII-8) the transmitter 52 of the user equipment 140 should use to transmit signals, as well as one or more maximum transmission power values (e.g., according to Table 1). The maximum transmission power values may include an EIRP value, such as 21 dBm, that may be achieved using automatic frequency control (AFC), which that may be lower than another EIRP value that may be used in other cases (e.g., when the user equipment 140 and base station 142 are both indoors, as discussed below). The maximum transmission power values may also include a maximum EIRP density value, which may be less than a different EIRP density value utilized when the user equipment 140 and base station 142 are both indoors.

As an example involving other jurisdictions, in Brazil, South Korea, and the European Union (and CEPT member countries), the instructions transmitted by the base station 142 may respectively indicate which sub-bands of the frequency bands 104, 106, 108 to use. Furthermore, the instructions may indicate that VLP settings should be used. Thus, a maximum EIRP value associated with a geographic location (e.g., a country, union, or continent), maximum EIRP density value with the geographic location, or both may also be indicated by the instructions the base station 142 sends to the user equipment 140.

However, if at decision block 172, the processor determines that the base station 142 is deployed indoors, at decision block 176, the processor 12 determines whether the user equipment 140 supports outdoor detection. In other words, the processor 12 determines whether the user equipment 140 is configured to, or otherwise capable of, determining whether the user equipment 140 is located outdoors. The processor 12 may determine whether the user equipment 140 supports outdoor detection based on data the processor 12 receives from the user equipment 140 when the user equipment 140 attempts to establish communications with the base station 142. In other words, the processor 12 may receive an indication (or data that is indicative) of whether the user equipment 140 supports outdoor detection. For example, user equipment 140 may transmit data indicating what sort of device (e.g., a particular model of phone or tablet or other electronic device) the user equipment 140 is. In some embodiments, the storage 16 may include data indicating whether such a device supports outdoor detection (or one or more capabilities such as Global Positioning System (GPS), Light Detection and Ranging (LiDAR), ambient light detection, temperature sensors, and so on), and the processor 12 may utilize the data to determine whether the user equipment 140 supports outdoor detection. In response to determining the user equipment 140 does not support outdoor detection, at process block 174, the processor 12 causes the user equipment 140 to be configured with low transmission power.

Conversely, if, at decision block 176, the processor 12 determines that the user equipment 140 supports outdoor detection, at process block 178, the processor 12 initially defaults to causing the user equipment 140 to be configured to transmit data using one or more greater maximum power values than the maximum power values discussed above with respect to process block 174. For example, in Brazil, South Korea, and the European Union (and CEPT member countries), the base station 142 may transmit instructions indicating that the transmitter 52 of the user equipment 140 should be configured to utilize a maximum EIRP value, maximum EIRP density value, or both in accordance with LPI as defined in these jurisdictions. As another example, if the case of the United States, the instructions may be indicative of an EIRP value that is greater than 21 dBm, an EIRP density value that is greater than −1 dBm/MHz, or both. In any case, it should also be noted that the instructions may be indicative of a frequency or range of frequencies (e.g., sub-bands or channels) with the frequency band 102 that the user equipment 140 should utilize when transmitting data.

At process block 180, the processor 12 receives an indication of the user equipment 140 location. More specifically, the processor 12 receives data (e.g., from the user equipment 140) indicative of whether the user equipment 140 is located indoors or outdoors. For example, the user equipment 140 may determine (as discussed below with respect to decision block 246 of FIG. 11) whether the user equipment 140 is located indoors or outdoors and provide an indication of such a determination to the processor 12 of the base station 142.

Based on the received indication, at decision block 182, the processor 12 determines whether the user equipment 140 is located indoors or outdoors. Upon determining that the user equipment 140 is outdoors, at process block 174, the processor 12 causes the user equipment 140 to be configured with low transmission power.

However, if, at decision block 182, the processor 12 determines that the user equipment 140 is located indoors, at process block 184, the processor 12 may cause the user equipment 140 to maintain the ability to transmit data with high power. In one embodiment, to perform process block 184, the processor 12 may take no action in response to determining the user equipment is located indoors. Accordingly, the process 170 enables the base station 142 to control one or more maximum transmission power levels (e.g., an EIRP value, EIRP density value, or both), frequency ranges, or both that the transmitter 52 of the user equipment 140 utilizes to enable the user equipment 140 to comply with local rules and regulations. For example, in cases in which the base station 142 is outdoors, the user equipment 140 is outdoors, the user equipment 140 does not support outdoor detection, or any combination thereof, the base station 142 may cause the user equipment 140 to utilize relatively lower maximum transmission power values. Conversely, in instances in which the base station 142 and user equipment 140 are both indoors, the base station 142 may enable the user equipment 140 to be configured to utilize relatively greater maximum transmission power values.

Figure 10:
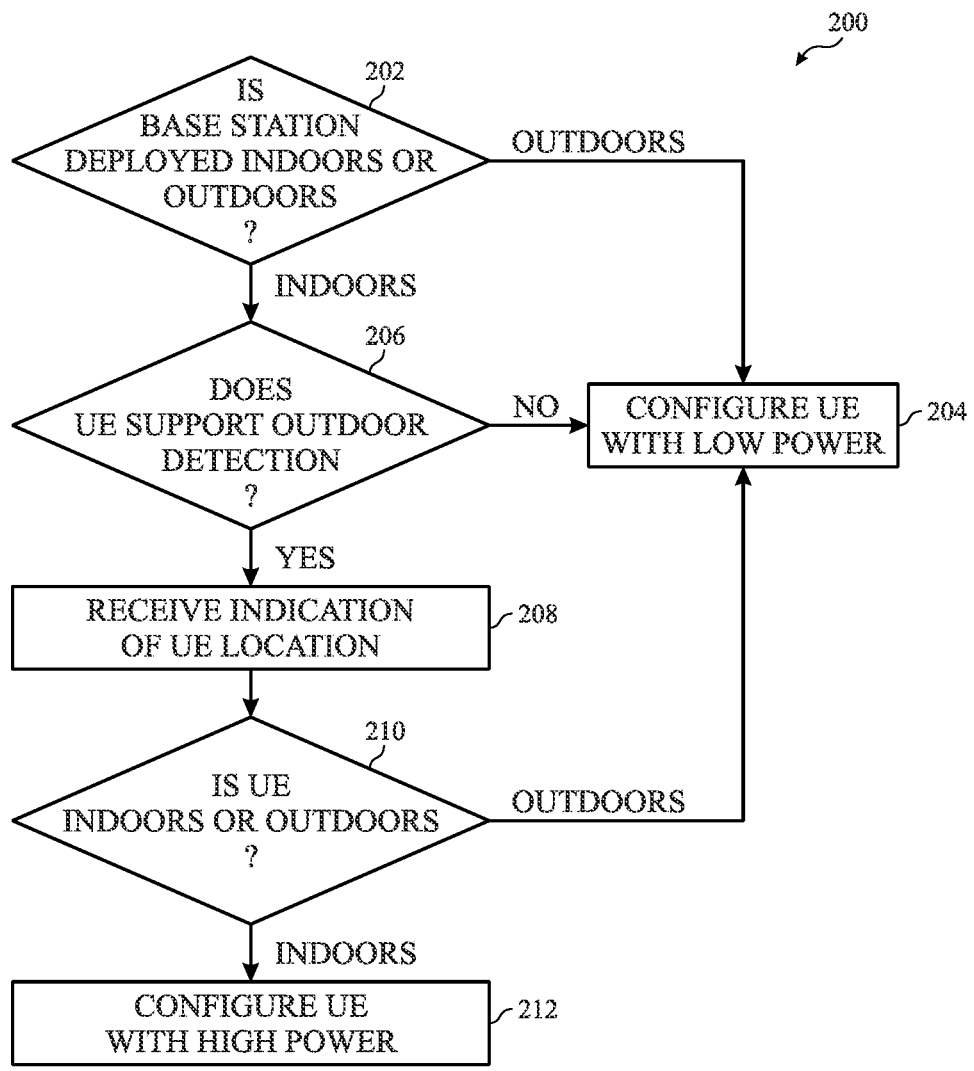
FIG. 10 is flow diagram of another process that the base stations of FIG. 7 and FIG. 8 may perform to control transmission power utilized by the user equipment of FIG. 7 and FIG. 8 depending on whether the base station and the user equipment is indoors or outdoors depending on whether the base station and the user equipment is indoors or outdoors, according to an embodiment of the present disclosure.

Continuing with the drawings, FIG. 10 is a flow diagram of another process, process 200, that the base station 142 may perform to control transmission power of a transmitter 52 of the user equipment 140, according to an embodiment of the present disclosure. Any suitable device (e.g., a controller) that may control components of the base stations 142, such as the processor 12, may perform the process 200. In some embodiments, the process 200 may be implemented by executing instructions stored in a tangible, non-transitory, computer-readable medium, such as the memory 14 or storage 16, using the processor 12. For example, the process 200 may be performed at least in part by one or more software components, such as an operating system of one or more of the base stations 142, one or more software applications of the base stations 142, and the like. Furthermore, while the process 200 is described using steps in a specific sequence, it should be understood that the present disclosure contemplates that the described steps may be performed in different sequences than the sequence illustrated, and certain described steps may be skipped or not performed altogether.

At decision block 202, the processor 12 determines whether the base station 142 is deployed indoors or outdoors. The processor 12 may make such a determination in the same manner as discussed above with respect to decision block 172 of the process 170 of FIG. 9. If, at decision block 202, the processor 12 determines that the base station 142 is deployed outdoors, at process block 204, the processor 12 causes the user equipment 140 to be configured with low transmission power as discussed above with respect to process block 174 of the process 170 of FIG. 9.

However, if, at decision block 202, the processor 12 determines that the base station 142 is deployed indoors, at decision block 206, the processor 12 determines whether the user equipment 140 supports outdoor detection. The processor 12 may make such a determination in the same manner as discussed above with respect to decision block 176 of the process 170 of FIG. 9. In response to determining the user equipment 140 does not support outdoor detection, at process block 204, the processor 12 causes the transmitter 52 of the user equipment 140 to be configured with low transmission power.

Conversely, if, at decision block 206, the processor 12 determines that the user equipment 140 supports outdoor detection, at process block 208, the processor 12 receives an indication of the location of the user equipment 140 location. For instance, as discussed above with respect to process block 180 of the process 170 of FIG. 9, the processor 12 may receive data from the user equipment 140 indicative of whether the user equipment 140 is located indoors or outdoors.

Based on the received indication, at decision block 210, the processor 12 determines whether the user equipment 140 is located indoors or outdoors. Upon determining that the user equipment 140 is outdoors, at process block 204, the processor 12 causes the transmitter 52 of the user equipment 140 to be configured with low transmission power. In particular, the processor 12 may cause the transmitter 52 of the user equipment 140 to be configured to transmit data using one or more lesser maximum power values than the maximum power values discussed above with respect to process block 174 of the process 170 of FIG. 9. Accordingly, the base station 142 may perform the process 200 to control one or more maximum transmission power levels (e.g., an EIRP value, EIRP density value, or both), frequency ranges, or both that the transmitter 52 of the user equipment 140 utilizes to enable the user equipment 140 to comply with local rules and regulations.

However, in response to determining the user equipment 140 is indoors, at process block 212, the processor 12 causes the transmitter 52 of the user equipment 140 to be configured to transmit data using one or more greater maximum power values than the maximum power values discussed above with respect to process block 178 of the process 170 of FIG. 9. Accordingly, the base station 142 may perform the process 200 to control one or more maximum transmission power levels (e.g., an EIRP value, EIRP density value, or both), frequency ranges, or both that the transmitter 52 of the user equipment 140 utilizes to enable the user equipment 140 to comply with local rules and regulations.

Figure 11:
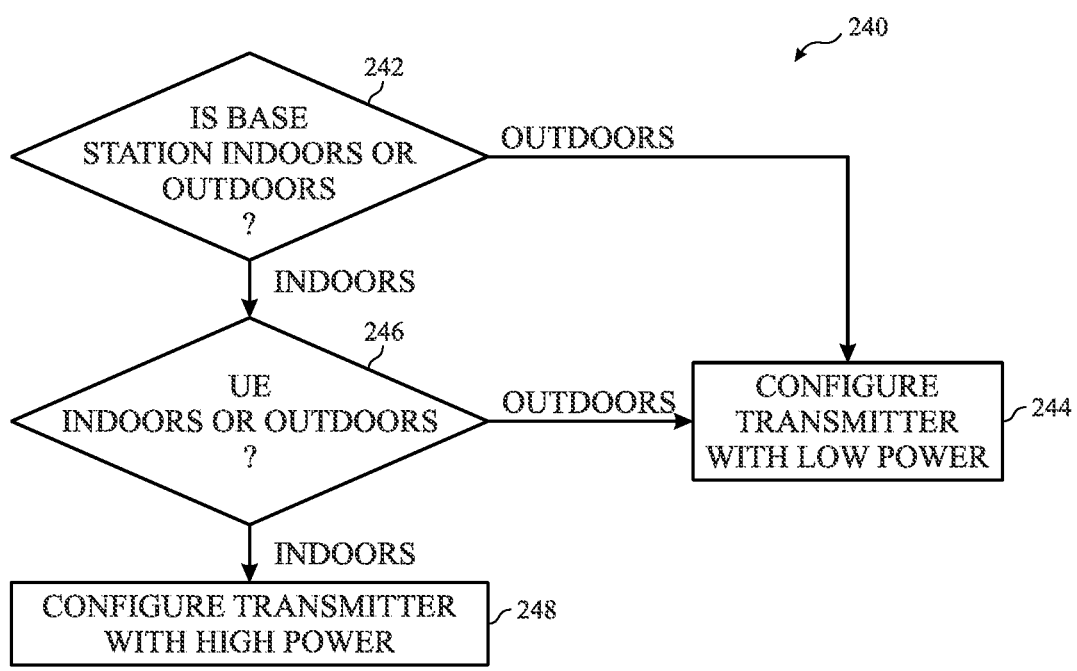
FIG. 11 is flow diagram of a process that the user equipment of FIG. 7 and FIG. 8 may utilize to control transmission power utilized by the user equipment, according to an embodiment of the present disclosure.

In some embodiments, the user equipment 140 may control transmission power of the transmitter 52. Indeed, FIG. 11 is a flow diagram of a process 240 that the user equipment 140 (e.g., electronic device 10) may perform to control transmission power utilized by the transmitter 52 of user equipment 140, according to an embodiment of the present disclosure. Any suitable device (e.g., a controller) that may control components of the user equipment 140, such as the processor 12, may perform the process 240. In some embodiments, the process 240 may be implemented by executing instructions stored in a tangible, non-transitory, computer-readable medium, such as the memory 14 or storage 16, using the processor 12. For example, the process 240 may be performed at least in part by one or more software components, such as an operating system of the user equipment 140, one or more software applications of the user equipment 140, and the like. Furthermore, while the process 240 is described using steps in a specific sequence, it should be understood that the present disclosure contemplates that the described steps may be performed in different sequences than the sequence illustrated, and certain described steps may be skipped or not performed altogether. Additionally, before proceeding to discuss operations included in the process 240, it should be noted that the process 240 may be performed in response to the user equipment 140 attempting to establish or establishing wireless communication with the base station 142.

At decision block 242, the processor 12 of the user equipment 140 determines or receives an indication of whether the base station 142 is deployed indoors or outdoors. The processor 12 of the user equipment 140 may determine whether the base station 142 is deployed indoors or outdoors based on an instruction received from the base station 142 to indicate one or more maximum transmission power values (e.g., maximum EIRP, maximum EIRP density, or both) that the transmitter 52 of the user equipment 140 may utilize when transmitting data utilizing unlicensed frequency bands. These maximum transmission power values may be thought of as an "original," "initial," or "default" transmission power (e.g., a first maximum transmission power that the transmitter 52 of the user equipment 140 may use after communicatively coupling to the base station 142). The instruction itself may be indicative of whether the base station 142 is deployed indoors or deployed outdoors because the maximum transmission power indicated by the instruction may be indicative of whether the base station 142 is deployed indoors or outdoors. In other words, particular maximum transmission power values that are based on the location of the base station 142 (e.g., indoor or outdoor deployment, geographic location, or both), may be used. For example, when the base station 142 is deployed indoors, the "default" maximum transmission power may be a relatively higher value or range or values than a different maximum transmission power that a different base station 142 that is deployed outdoors would instruct the user equipment 140 to use. Furthermore, the memory 14 or storage 16 of the user equipment 140 may include data (e.g., one or more lookup tables) indicating values of "default" maximum transmission power values while also indicating, for each of the "default" maximum transmission power values, whether the value is associated with an indoor or outdoor deployment of the base station 142. The lookup tables may also indicate one or more geographic areas (e.g., countries or groups of countries) associated with a particular value. Accordingly, the processor 12 of the user equipment 140 may utilize one or more lookup tables to determine whether a maximum transmission power indicated by an instruction received from the base station 142 is associated with an indoor or outdoor deployment of the base station 142 in order to determine whether the base station 142 is deployed indoors or outdoors.

In response to determining or receiving the indication that the base station 142 is deployed outdoors, at process block 244, the processor 12 of the user equipment 140 may configure the transmitter 52 of the user equipment 140 to operate with a low power. In particular, the processor 12 of the user equipment 140 may limit or reduce a maximum transmission power of the transmitter 52. For instance, the processor 12 may reduce or limit the maximum transmission power of the transmitter 52 by causing the transmitter 52 to switch from using the "default" maximum transmission power to using a different maximum transmission power that is less than the "default" maximum transmission power. In some embodiments, the processor 12 may cause the transmitter 52 of the user equipment 140 to be configured to transmit data using one or more lesser maximum power values than the maximum power values discussed above with respect to process block 174 of the process 170 of FIG. 9. Accordingly, the user equipment 140 may perform the process 200 to control one or more maximum transmission power levels (e.g., an EIRP value, EIRP density value, or both), frequency ranges, or both that the transmitter 52 of the user equipment 140 utilizes to enable the user equipment 140 to comply with local rules and regulations.

In additional or alternative embodiments, the processor 12 of the user equipment 140 may limit the maximum transmission power of the transmitter 52 of the user equipment 140 following the Power Management Maximum Power Reduction (P-MPR) framework described in European Telecommunications Standards Institute (ETSI) Technical Specification (TS) 136 101 V10.24.1, which is also known as 3GPP TS 36.101 version 10.24.1. As another example, the user the processor 12 may limit the maximum transmission power of the transmitter 52 of the user equipment 140 to use a maximum power (P-Max) in accordance with the P-Max framework described in 3GPP TS 36.101 and 3GPP TS 36.331 (entitled "Requirements for support of radio resource management"). As yet another example, the processor 12 alter a power class that may be defined in executable instructions (e.g., of an algorithm) stored on the memory 14 or storage 16 that the processor 12 may execute. For instance, the instructions of the algorithm may define several different maximum transmission power values (e.g., several power classes) that the transmitter 52 may use. The processor 12 may limit the maximum transmission power of the transmitter 52 of the user equipment 140 by executing the instructions to cause the maximum transmission power to change from one value to a lower value. In other words, the processor 12 may cause the transmitter 52 to switch from utilizing a higher power class to utilizing a lower power class. Furthermore, it should be noted that when performing process block 244, the processor 12 may also cause the user equipment 140 to indicate (e.g., by transmitting data) to the base station 142 that the maximum transmission power of the user transmitter 52 has been limited or reduced. More specifically, the processor 12 may cause the user equipment 140 to indicate to the base station 142 that the maximum transmission power of the transmitter 52 has been limited or reduced utilizing RRC signaling (described in 3GPP TS 38.331, entitled "Radio Resource Control (RRC); Protocol specification"), MAC-CE (e.g., using a MAC header bit or an extension of the power headroom framework), or the physical layer (PHY) of transmitted data (e.g., utilizing a bit in the physical layer as a feedback bit to indicate that the user equipment 140 has modified the maximum transmission power).

However, if, at decision block 242 the processor 12 of the user equipment 140 determines that the base station is deployed indoors, at decision block 246, the processor 12 may determine whether the user equipment 140 is located indoors or outdoors. To make such a determination, the user equipment 140 may utilize, as non-limiting examples, GPS, LiDAR, indoor position beacons, or a combination thereof. For example, the processor 12 may compare the reception level of a GPS signal to a threshold value to determine whether the user equipment 140 is indoors. In this example, when the reception level of the GPS signal is below the threshold, the processor 12 may determine that the user equipment 140 is located indoors. As another example, the user equipment 140 may determine the GPS location of the user equipment 140 corresponds to a structure (e.g., a building), and assume that the user equipment 140 is located indoors. As another example, the processor 12 may utilize LiDAR data collected by the sensors of the user equipment 140 to determine whether the user equipment 140 is located indoors or outdoors. For instance, LiDAR data may be indicative of the presence of walls or other structural elements included in buildings. The processor 12 may determine that the user equipment 140 is indoors when the LiDAR data is indicative of walls or other structural elements included in buildings being present. The processor 12 may determine that the user equipment 140 is outdoors when the LiDAR data is indicative of the absence of walls or other structural elements included in buildings. As yet another example, when the processor 12 detects the presence of indoor position beacons, the processor 12 may determine that the user equipment 140 is indoors. Conversely, when the processor 12 determines an absence of indoor position beacons, the processor 12 may determine that the user equipment 140 is outdoors.

In response to determining the user equipment 140 is outdoors, the processor 12 may cause the maximum transmission power that the transmitter 52 of the user equipment 140 may utilize to be limited or reduced as discussed above with respect to process block 244. Conversely, if, at decision block 246 the processor 12 determines that the user equipment 140 is indoors, at process block 248, the processor 12 may configure or maintain the transmitter 52 of the user equipment 140 to operate with a high power. In particular, the processor 12 may cause the transmitter 52 of the user equipment 140 to utilize an available transmission power. For example, as noted above, the instruction sent by the base station 142 indicate one or more maximum transmission power values (e.g., maximum EIRP, maximum EIRP density, or both) that the transmitter 52 of the user equipment 140 may utilize to transmit data. In some cases, the base station 142 may transmit select the maximum transmission power values based on the location of the base station 142 (e.g., indoor or outdoor deployment, geographic location, or both), which may cause the transmitter 52 of the user equipment 140 to be configured to utilize a "default" maximum transmission power (which may correspond to one or more "default" power transmission values included in, or indicated by, an instruction sent by the base station 142). In other words, the transmitter 52 of the user equipment 140 may be initially configured to utilize the "default" power transmission values indicated by an instruction received from the base station 142. However, when the processor 12 performs process block 248, the processor 12 may refrain from taking action and allow the transmitter 52 to continue to be configured to transmit data in accordance with the "default" transmission power. Accordingly, by utilizing the process 240, the user equipment 140 may control the transmission power of the transmitter 52 to stay in compliance with rules and regulations associated with different geographic locations (e.g., countries or groups of countries).

As such, the techniques described herein enable electronic devices to transmit data in unlicensed frequency ranges in accordance with regulations associated with a geographic location in which the electronic device is located. More specifically, as discussed above base stations and user equipment may perform techniques that enable the power of a transmitter of the user equipment to be controlled to operate in accordance with local rules or regulations, such as those directed to transmission power levels permissible based on whether the base station and/or the user equipment is indoors or outdoors.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A base station deployed indoors, comprising:
a transceiver disposed inside of a building and configured to send and receive data; and
processing circuitry communicatively coupled to the transceiver and configured to:
receive, using the transceiver, a first indication from user equipment communicatively coupled to the base station indicative of whether the user equipment is configured to detect whether the user equipment is located inside of the building or outside of the building; and
based on the first indication:
send, using the transceiver, a first instruction to the user equipment instructing the user equipment to transmit data using a first transmission power;
after sending the first instruction, receive, using the transceiver, a second indication from the user equipment indicative of whether the user equipment is located inside of the building or outside of the building; and
send, using the transceiver, a second instruction to the user equipment instructing the user equipment to transmit data using a second transmission power less than the first transmission power based on the second indication indicating that the user equipment is located outside of the building.

2. The base station of claim 1, wherein the processing circuitry is configured to maintain transmission of data by the user equipment using the first transmission power based on the second indication indicating that the user equipment is located inside of the building.

3. The base station of claim 1, wherein the processing circuitry is configured to
send, using the transceiver, a third instruction to the user equipment to transmit data using the second transmission power based on the first indication indicating that the user equipment is not configured to detect whether the user equipment is located inside of the building or outside of the building.

4. The base station of claim 3, wherein the processing circuitry is configured to determine whether the user equipment is located inside of the building or outside of the building based on the first indication indicating that the user equipment is configured to detect whether the user equipment is located inside of the building or outside of the building.

5. The base station of claim 4, wherein the processing circuitry is configured to determine whether the user equipment is located inside of the building or outside of the building based on the second indication.

6. The base station of claim 1, wherein the user equipment is configured to transmit data using a frequency ranging from 5.925 to 7.125 gigahertz.

7. The base station of claim 1, wherein
the first transmission power corresponds to a first maximum effective isotropic radiated power (EIRP) value that is greater than 24 decibel-milliwatts (dBm) and less than or equal to 30 dBm, a first maximum EIRP density value equal to 17 dBm/megahertz (MHz), or both, and
the second transmission power corresponds to a second maximum EIRP value that is greater than or equal to 21 dBm and less than or equal to 24 dBm, a second maximum EIRP density value equal to −1 dBm/MHz, or both.

8. The base station of claim 7, wherein
the first transmission power corresponds to the first maximum EIRP density value, and
the second transmission power corresponds to the second maximum EIRP density value.

9. The base station of claim 7, wherein
the first transmission power corresponds to both the first maximum effective isotropic radiated power (EIRP) value and the first maximum EIRP density value, and
the second transmission power corresponds to the second maximum EIRP value and the second maximum EIRP density value.

10. A computer-implemented method, comprising:
sending, from a transmitter of user equipment to a base station deployed indoors, a first indication indicative of the user equipment being configured to detect whether the user equipment is located indoors or outdoors; and
based on the first indication:
after sending the first indication, receiving, at a receiver of the user equipment, a first instruction from the base station instructing the user equipment to configure the transmitter of the user equipment to transmit data with a first transmission power;
after receiving the first instruction, sending, from the transmitter to the base station, a second indication indicative of whether the user equipment is located indoors or outdoors;
after sending the second indication, receiving, at the receiver, a second instruction from the base station instructing the user equipment to transmit data with a second transmission power that is less than the first transmission power based on the second indication indicating that the user equipment is located outdoors; and
configuring, using at least one processor of the user equipment, the transmitter of the user equipment to transmit data with the second transmission power based on second indication.

11. The computer-implemented method of claim 10, wherein the first instruction comprises a maximum value of the first transmission power.

12. The computer-implemented method of claim 10, comprising:
receiving, at the receiver, a third indication from the base station that the base station is located indoors; and
sending, from the transmitter of the user equipment, the first indication to the base station that the user equipment is located outdoors based on the third indication that the base station is located indoors.

13. The computer-implemented method of claim 10, wherein the first transmission power, the second transmission power, or both are based on a geographic location of the user equipment.

14. The computer-implemented method of claim 10, comprising, after sending the first indication, receiving from the base station the second instruction based on the first indication indicating that the user equipment is not configured to detect whether the user equipment is located indoors or outdoors.

15. A non-transitory computer-readable medium comprising instructions that, when executed by processing circuitry, cause the processing circuitry to:
send to a base station deployed inside of a building or receive from user equipment, a first indication of whether the user equipment is configured to detect whether the user equipment is located inside of the building or outside of the building; and
based on the first indication:
cause a transmitter of the user equipment to be configured to transmit data using a first transmission power based on a first instruction sent to the user equipment or received from the base station;
after causing the transmitter to be configured to transmit data using the first transmission power, transmit to the base station or receive from the user equipment a second indication of whether the user equipment is located inside of the building or outside of the building; and
cause the transmitter of the user equipment to be configured to transmit data using a second transmission power less than the first transmission power based on the second indication indicating that the user equipment is located outside of the building.

16. The non-transitory computer-readable medium of claim 15, wherein the instructions, when executed, cause the processing circuitry to cause the transmitter of the user equipment to transmit the first indication based on the base station being deployed inside of the building.

17. The non-transitory computer-readable medium of claim 16, wherein the user equipment comprises the non-transitory computer-readable medium, the processing circuitry, or both.

18. The non-transitory computer-readable medium of claim 15, wherein the base station comprises the non-transitory computer-readable medium, the processing circuitry, or both.

19. The non-transitory computer-readable medium of claim 15 wherein the instructions, when executed, cause the processing circuitry to
cause the transmitter of the user equipment to transmit data using the first transmission power based on the base station being deployed inside of the building and the first indication indicating that the user equipment is not configured to determine whether the user equipment is located inside of the building or outside of the building.

20. The non-transitory computer-readable medium of claim 15, wherein
the instructions, when executed, cause the user equipment to be configured to transmit data using a frequency ranging from 5.925 to 7.125 gigahertz,
the first transmission power corresponds to a first maximum effective isotropic radiated power (EIRP) value that is greater than 24 decibel-milliwatts (dBm) and less than or equal to 30 dBm, a first maximum EIRP density value equal to 17 dBm/megahertz (MHz), or both, and the second transmission power corresponds to a second maximum EIRP value that is greater than or equal to 21 dBm and less than or equal to 24 dBm, a second maximum EIRP density value equal to −1 dBm/MHz, or both.

\* \* \* \* \*